June 16, 1942. H. L. SMITH, JR 2,286,999
CANNING PROCESS
Filed April 19, 1939
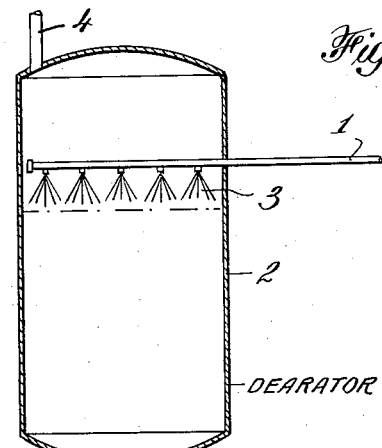
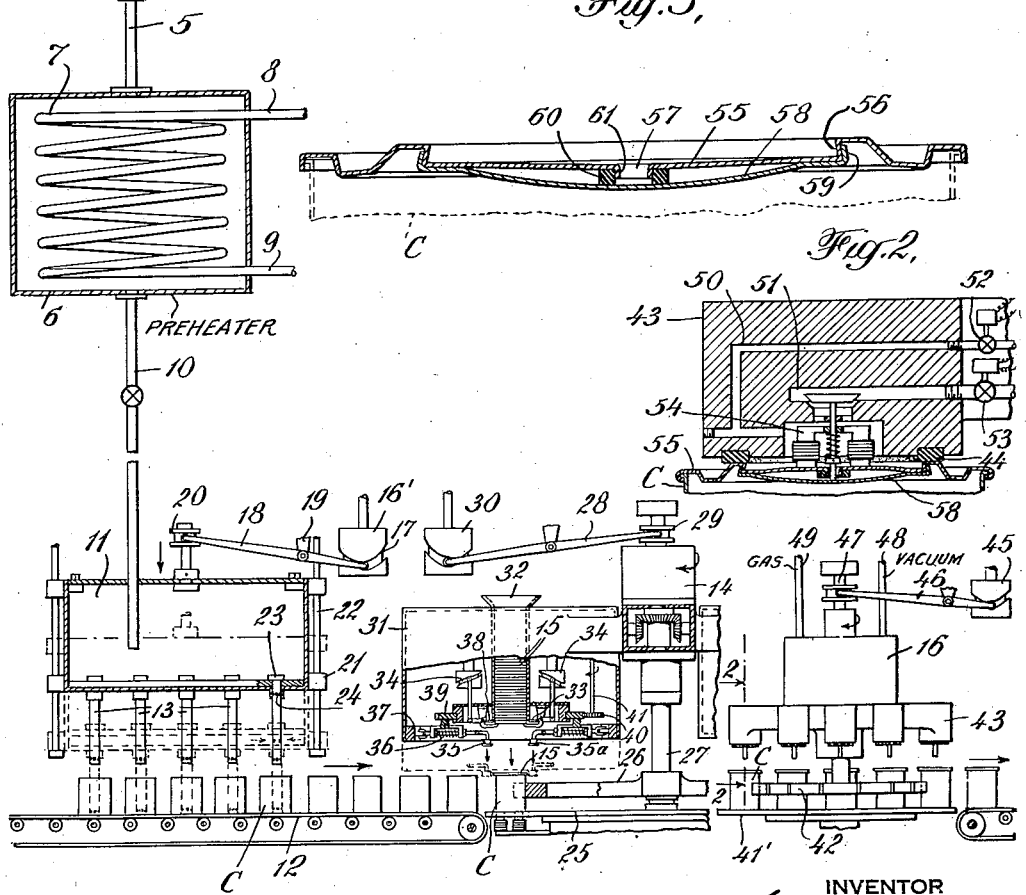
INVENTOR
Horace L. Smith Jr.
BY
Pennie, Davis, Marvin, & Edmonds
HIS ATTORNEYS Patented June 16, 1942

2,286,999

UNITED STATES PATENT OFFICE 2,286,999

CANNING PROCESS

Horace L. Smith, Jr., Richmond, Va., assignor, by mesne assignments, to The Girdler Corporation, Louisville, Ky., a corporation of Delaware Application April 19, 1939, Serial No. 268,744

5 Claims. (Cl. 99—182)

This invention relates to a method of processing food products and more particularly to a method of canning liquids or food products, comprising liquids such as fruit and vegetable juices or the like, with substantially no air in either the product or the head space of the can.

It has heretofore been proposed to provide cans used for packing food products with check valves which permit the egress of air or gas and prevent ingress of air or gas and to submit such cans, after packing and sealing, to a vacuum to remove as much of the air as is possible from the head space in the can. Such processes have only been partially successful.

Dissolved oxygen or air cannot be removed from a body of liquid, such as the contents of a can, except by boiling the liquid for a prolonged interval, a treatment which alters the flavor and often the color and consistency of the product. While evacuation of the air from a can may be facilitated by performing the operation at an elevated temperature, the temperatures cannot be raised too high while air is present in the can, without injuring or spoiling the contents. At the temperatures at which the operation may be safely conducted, it is not possible, in known commercial operations, to exhaust the air from a can to a point where the amount of air remaining is not harmful to the product upon aging or in subsequent operations such as sterilizing.

In the present invention, I have devised an improved method of processing cans containing liquid food products whereby I am able to remove substantially all of the air both from the product and from the head space of the can. The method consists of a plurality of steps, each of which contributes to the desired result. The material to be treated, such as fruit or vegetable juices, soups, other liquid, semi-liquid or moisture containing food products or the liquid portion thereof, is first subjected to a deaerating step to remove substantially all of the entrained air and gas therefrom. This may be accomplished by prolonged boiling at atmospheric or higher pressures as an incident to concentration or otherwise, or, where the product is damaged by higher temperatures, the deaeration may be effected by subjecting the liquid in thin films or fine spray form to a vacuum high enough to cause boiling or vaporization of water therefrom at a relatively low temperature whereby the water vapor evolved washes all of the dissolved air, oxygen and other gases out of the material. With the liquid in finely divided form such as thin films or spray drops, this deaeration can be carried out rapidly and without excessive heating or agitation of the liquid. I then deliver the material to the cans in a heated condition in such manner as to substantially prevent entrainment of air during the filling operations. I then apply the cover to the can, the cover being provided with a check valve of any suitable construction which will permit egress of air or gas and prevent ingress. After the cover has been applied and while the material is still at an elevated temperature, I quickly exhaust air from the can in an amount sufficient to reduce the absolute pressure in the head space of the can below the corresponding critical pressure at the temperature of the contents, thereby causing a portion of the liquid in the can to suddenly boil or vaporize. The water vapor or steam thus produced washes out all of the air from the head space of the can.

In some instances, it is advisable to replace a part of the air thus removed by an inert gas, such as nitrogen or carbon dioxide. This may be advantageously done where the size of the can and the vacuum produced as a result of my process may cause collapsing or pannelling of the can by atmospheric pressure. At the temperature at which I evacuate the cans, which in the case of certain products may be approximately 105 to 110° F., a vacuum of about 28 inches of mercury or more (an absolute pressure of about 2 inches of mercury or less) is used to produce the desired boiling, and the fluid remaining in the head space after the air has been washed out is water vapor. When the can cools, this water vapor condenses and a very high vacuum results. Where the size of the can is such that a vacuum of this character is inadvisable, I may add nitrogen, carbon dioxide, or other inert gas to the can until the vacuum is reduced to a suitable value, which may be approximately 10 inches of mercury with certain large size cans. I may also introduce such inert gases into the can after evacuating, in some instances, for the purpose of preserving the taste of the product. It has been found that some products packed in cans acquire a flat taste when the air is evacuated from the can. It has been found that the acquisition of this flat taste can be avoided by placing an inert gas in the head space of the can.

In the accompanying drawing, I have diagrammatically shown one form of apparatus suitable for use in practicing the process. In this drawing:

Figure 1 is a diagrammatic illustration of the apparatus employed in practicing the process;

Figure 2 is a detailed, sectional view on line 2—2 of Figure 1; and

Figure 3 is a sectional view of the head of the can provided with a check valve.

Referring to Figure 1 of the drawing, the reference numeral 1 designates a feed pipe for the material to be treated. This feed pipe communicates with a deaerating chamber 2 and is provided with nozzles or spray outlets to deliver the liquid into the interior of the deaerating chamber in finely divided form, such as the sprays 3, although thin films of liquid may be used with like results. The deaerating chamber is provided with a pipe 4 connected to a vacuum pump or other apparatus for creating a partial vacuum in the deaerating chamber. Substantially all of the entrained gas and air is removed from the liquid in the deaerating chamber. The bottom of this chamber is provided with an outlet 5, and in some instances, I find it desirable to preheat the deaerated liquid before it is delivered to the cans. In such instances, I provide a preheater 6 through which the fruit juices or the like may be passed and which is provided with a heating coil 7. Steam or other heating fluid is passed through the coil from an inlet pipe 8 to an outlet pipe 9. The bottom of the preheating chamber, or in case the preheating chamber is not used, the bottom of the deaerating chamber, is provided with an outlet pipe 10 which is connected to a filling machine 11 arranged over a belt 12. The pipe 10 must be provided with a pump or must be of sufficient length to form a barometric leg and insure gravity feed of the liquid from the deaerating chamber or the preheating chamber at the reduced pressures prevailing in the system at this point. The filling machine 11 comprises a closed tank into which the liquid is delivered. The filling pipes of the filling machine 11 are indicated at 13. From the filling apparatus 11, the cans C are conveyed to a closing machine 14 where can covers 15 of the type shown in Figure 3 of the drawing are applied. The cans then pass under a suitable vacuum apparatus 16 which withdraws air from the head space through the check valve in the cover of the can as hereinafter explained.

The belt 12 travels with a step by step motion coordinated with the operation of the filling machine 11 and feeds a number of cans, illustrated as five, into position beneath filling pipes 13 upon each movement, thus permitting filling of a plurality of cans in one operation. To prevent splashing of liquid during the filling operation and possible entrainment of air in the deaerated material, the filling machine is so arranged that it may be lowered into a position where the filling pipes 13 engage the bottoms of the cans during the filling operation. Any suitable mechanism may be employed for this purpose, and as shown, a cam 16' is used, having a cam groove 17 adapted to receive a roller mounted on the end of a lever 18. The lever is pivoted in a bracket 19 and has its end connected to a supporting member 20 secured to the tank of the filling apparatus 11. The tank is provided with sleeves 21 which receive guide rods 22 suitably supported on the frame of the machine. As shown, the filling pipes 13 pass through openings in the bottom of the tank 11 and are provided with closed upper ends 23. Adjacent the upper ends of the pipes 13, openings 24 are provided. When the filling tank 11 is in the raised position shown in full lines, the openings 24 are out of communication with the interior of the tank and delivery of the contents of the tank is therefore prevented. As the filling apparatus is lowered by the cam 16', the filling pipes remain in this position until just before the tank reaches its lower position shown in dotted lines. The bottoms of the pipes 13 then engage the bottoms of the cans, preventing further downward movement of the pipes. As the tank 11 is further lowered, the pipes move into the bottom of the tank as indicated in dotted lines at the right in Figure 1 to bring the openings 24 inside the tank and permit the liquid to flow from the tank 11 into the cans.

After the cans have been filled, they are transferred in any suitable manner to a rotating can holder 25 arranged beneath the can closing apparatus 14. The rotating can holder 25 comprises a base and a star-wheel 26 for the reception of the cans. It is driven by means of a shaft 27 which pass upwardly through the can closing apparatus which is slidingly supported thereon. This shaft rotates intermittently, its operation being timed to coordinate with the other elements of the apparatus. A plurality of can closing devices are radially mounted on the can closing apparatus and the entire structure is movable toward and away from the can by means of a pivoted lever 28, one end of which rides in a collar 29 mounted on the can closing apparatus 14, and the other end of which is received in the groove of a cam 30 similar to the cam 16'.

Each of the can closing devices comprises a member 31 having a tube 32 mounted therein to receive the can closures 15. Delivery of a single can closure at a time is controlled by suitable mechanism 33, which may be of known construction, and which is actuated by cams 34. When a can closure has been placed on the can beneath the closing apparatus as shown in Figure 1 and the closing apparatus 14 lowered to the dotted line position, two pairs of crimping rollers 35 and 35a are rotated around the can top to crimp it to the can. Each of these pairs of rollers is carried by an arm 38 and is normally retained in retracted position by spring 36 mounted on this arm. The pairs of rollers are adapted to be brought into operation when rotated about the can top by a cam 37 which is engaged by a roller on each arm 38. The arms 38 are supported in brackets carried by a gear 39 which is in turn rotated by a pinion 40 mounted on a shaft 41.

When the can closing mechanism 14 is lowered and one of the covers 15 delivered to the top of each can on the can holder as indicated in Figure 1, pinion 40 drives gear 39 to rotate the crimping rollers 35 around the top of the can and at the same time cam 37 moves the arms 38 and the rollers inwardly to perform the crimping operation.

The cans are then transferred to a second rotary can holder 41' comprising a base and a star-wheel 42 arranged beneath the vacuum apparatus 16. At this station, the air in the head space of the can is evacuated, and the evacuation is carried to a point which produces boiling of the contained liquid at the temperature at which the operation is performed to wash all air out of the head space. At a temperature of from 105 to 110° F., which temperature may safely be employed with most canned goods of this character, a vacuum of about 28 inches or more (an absolute pressure of about 2 inches of mercury or less) is employed. The temperature stated is by way of example only as many products require different temperatures and the vacuum produced is the corresponding vacuum necessary to produce boiling of the liquid in the can at the temperature employed. For instance, tomato juice may be filled at a temperature of 180–190° F. in which case the vacuum would be low.

The vacuum finally produced in the can as the result of the process will vary depending upon the size of the can. With larger size cans, the final absolute pressure must be high enough to prevent pannelling. As stated, provision may also be made for introducing an inert gas into the head space of the can at the vacuum station 16 and the apparatus disclosed, which is shown in detail in Figure 2 of the drawing, is provided with means for introducing this inert gas. The main chamber 16 of the vacuum apparatus communicates with a plurality of heads 43, one of which is shown in section in Figure 2 of the drawing and each of which is provided with a gasket 44 to form a gas-tight fit with the top of a can. The entire apparatus is raised and lowered in the manner heretofore described by means of a cam 45 and a pivoted lever 46. Lever 46 is connected to a collar carried by an arm 47 of the chamber 16.

A vacuum pipe 48 communicates with the chamber 16 and a second pipe 49 communicates with the chamber 16. Pipe 49 may be connected to a source of inert gas. Each of the heads 43 communicates with chamber 16 through gas port 50 and a vacuum port 51. Control valves 52 and 53, respectively, are arranged in these ports. An electromagnet 54 is also arranged in the head 43 in position to engage the can top, as shown in Figure 2 of the drawing.

Referring to Figure 3 of the drawing, which illustrates one form of can cover which may be employed, the can cover consists of a disc which is adapted to be secured to the body of the can in the usual manner and which is provided with a slightly dished central portion 55 connected to the surropnding portion by a circular flange 56. An opening 57 is provided in the portion 55 of the can cover. A dished disc 58 is secured to the underside of the can cover, the disc being provided with a peripheral flange 59 which frictionally engages the flange 56 of the cover. A rubber gasket 60 is arranged around the opening in the cover, the material forming the opening being depressed around it as at 61 to properly position the gasket.

The check valve cover operates in the following manner: Central portion 55 of the cover is sufficiently flexible to give due to pressure differences on the inside and outside of the cover, whereas disc 58 is rigid. The slight dishing of central portion 55 tends to keep the valve closed, but when pressure in the can exceeds the external pressure by more than a predetermined amount, it is forced away from disc 58 and carries gasket 60 with it. Air or other gas may be withdrawn from the can by the application of suction, the air leaking through the space between the flanges 56 and 59 and through the space between the portion 55 of the can cover and the body portion 58 of the valve disc. When sufficient air however, has been withdrawn from the can to reduce the pressure in the head space to a pressure below atmospheric pressure, atmospheric pressure on the cover tends to depress the central portion 55 of the cover and compress the gasket 60 between the cover and the disc 58 to prevent ingress of air.

With a cover of this character, or of other construction whereby a check valve is produced, the process is carried out in the apparatus shown diagrammatically in Figure 1 in the following manner: When treating fruit juices, the liquid may be delivered to the deaerator at a temperature of substantially 115° F. but this temperature will vary with different products. If the material is at a sufficiently high temperature from prior treatments, it need not be further heated prior to deaeration but if the material is not at such temperature, preheating is employed. Spraying the material into the deaerating chamber and with the vacuum connection 4 to the top of the deaerating chamber results in the removal of substantially all entrained air and gases therefrom. The degree of vacuum employed in the deaerating chamber is preferably sufficient to cause boiling of water from the product of the prevailing temperature, whereby complete removal of air and gases is assured. As hereinabove noted, the vacuum deaeration operation may be dispensed with where the product has been deaerated by prolonged boiling at atmospheric or super-atmospheric pressures or otherwise. Prolonged boiling is sometimes employed to concentrate food products, and the water vapor evolved in such boiling sweeps air and other non-condensible gases out of the product. The material in the deaerated condition is delivered to the filling apparatus 11 and is fed from the filling apparatus through the pipes 13 to the bottoms of the cans C so as to eliminate splashing and thereby prevent re-aeration by entrainment or absorption of additional air. Cans C travel along belt 12 and are transferred to rotary can holder 25 under the closing machine 14. The closing machine may be any suitable type of mechanism for applying a can head to the can. After the can head has been applied, the can is transferred to the rotary can holder 41 under the vacuum apparatus. The vacuum apparatus may be designed to create a vacuum over the check valve opening or over the entire head of the can whereby air is withdrawn from the can through the check valve. Air is withdrawn by suction to a sufficient amount to reduce the absolute pressure in the can below the corresponding critical pressure at the temperature of the contents. When the materials are fed into the deaerator at a temperature of 115° F., the temperature at the time of the vacuum treatment may be in the neighborhood of 110° F. after suitable treatment in the deaerator. If the temperature of the product after deaeration is too low, it may be raised in the preheater 6. When sufficient air is withdrawn to cause boiling of the contents of the can, the vapors so created rise into the head space of the can and wash all of the air out of it. The release of the vacuum causes the check valve to close under the action of excess external pressure, and the can is thereby sealed without the reintroduction of any air thereto. The cans are then transferred to belt 61, and conveyed to other apparatus to be processed and cooled in any desired way. In canning vegetables, such as string beans and the like, the solid contents are placed in the cans and the cans delivered to the belt 12. The liquid in which the vegetables are canned is passed through the deaerating chamber and delivered to the cans at the filling machine 11 and the cans then pass through the remaining steps of the process.

When the vacuum produced in the head space of the can is to be partially relieved by introduction of an inert gas, heads 43 of the type shown in Figure 2 of the drawing may be employed. The desired vacuum is first created by opening the valve 53 in the port 51 between the head and the chamber 16 and placing the chamber in communication with a source of suction through pipe 48. During this operation, air is withdrawn from the head space of the can, the portion 55 of the cover flexing outwardly due to the reduced pressure in the head 43 to thus open the valve. After the vacuum has been produced in the head space of the can, valve 53 is closed and valve 52 in port 50 is opened. Pipe 49, communicating with the chamber 16, is then connected to a source of inert gas. During this operation, the pressure on the outside of the can cover would normally close the check valve by causing the central portion 55 of the can cover to flex inwardly. To permit the introduction of the inert gas, the valve is retained in an open position by energizing the electromagnet 54 to attract the adjacent portion of the cover and prevent inward flexing. As stated, the preferred practice is to relieve the vacuum created in the head space of the can to a vacuum corresponding to about 10 inches of mercury.

The temperature at which the product is subjected to vacuum for the purpose of removing air from the unoccupied space of the can may be widely varied. In general, it is preferred to use temperatures well above room temperature and preferably above 100° F., since boiling or evaporation of water or other liquid can be produced at this temperature by subatmospheric pressures not appreciably below 2 inches of mercury absolute, and a vacuum of this order can be economically obtained in commercial operations. Most food products are not adversely affected by boiling or evolution of vapor therefrom at such temperatures. Thus citrus food products and juices may be subjected to vacuum evaporation sufficient to remove air from the head space of the can at about 110° F. without appreciable loss of flavor or other injury. When, for this reason, it is undesirable to subject the product under treatment to temperatures as high as about 100° F., the vacuum treatment may be carried out at lower temperatures in the range from about 80° F. to 100° F., and correspondingly increased values of vacuum (lower absolute pressures) are used to produce boiling or evaporation at these temperatures. In such cases, the vacuum may be such that the absolute pressure within the can may reach 1 inch of mercury or less.

Although my process is particularly useful in connection with the canning of food products comprising or including juices or free water or other liquids, it is also applicable to solid or semi-solid food products that contain water or other vaporizable liquid. Thus canned products such as plum pudding, Boston brown bread, meat hash, salmon or other fish products, dog food, etc., which are usually packed with a head space or other free space between the product and the can, may be subjected to my process for removing air and other non-condensible gases from such free space. The product is heated to a suitable temperature and a vacuum is applied, preferably through a check valve in the can cover, until boiling or vaporization of liquid from the product creates sufficient vacuum to wash the air out of the space between the product and the can.

The several steps or features of my invention may be separately employed.

I claim:

1. A method for processing and packaging a food product including a liquid, which comprises deaerating said product so as to remove substantially all air therefrom, thereafter delivering the deaerated product into a container in a manner to prevent re-entrainment of air in the product, leaving a head space in the container, subjecting said head space to a sub-atmospheric pressure below the critical pressure of the liquid contents of the container so as to cause boiling of said contents at the existing temperature thereof, thereby sweeping the air out of said head space by means of the evolved vapors, and then sealing the container in such manner as to prevent re-entrance of air into said head space.

2. A method for processing and packaging a food product including a liquid, which comprises deaerating said product so as to remove substantially all air therefrom, thereafter delivering the deaerated product into a container in a manner to prevent re-entrainment of air in the product, leaving a head space in the container, subjecting said head space to a sub-atmospheric pressure below the critical pressure of the liquid contents of the container so as to cause boiling of said contents at the existing temperature thereof, thereby sweeping the air out of said head space by means of the evolved vapors, introducing inert gas into the head space in such manner as to prevent re-entrance of air into said space, and then sealing the container while said space is filled with said inert gas.

3. A method for processing and packaging a liquid food product, which comprises deaerating said product by delivering the same in finely divided form into a chamber having a vacuum therein and thereby removing substantially all air from the product, thereafter delivering the deaerated product into a container in a manner to prevent re-entrainment of air in the product, leaving a head space in the container, subjecting said head space and the liquid contents in the container to a sub-atmospheric pressure such as to cause boiling of said contents at the existing temperature thereof, thereby to sweep the air out of said head space by the vapors evolved from such boiling, and then sealing the container in such manner as to prevent re-entrance of air into said head space.

4. A method for processing and packaging a liquid food product, which comprises deaerating said product by delivering the same in finely divided form into a chamber having a vacuum therein and thereby removing substantially all air from the product, thereafter delivering the deaerated product into a container at an elevated temperature and in a manner to prevent re-entrainment of air in the product, leaving a head space in the container, subjecting said head space and the liquid contents in the container to a sub-atmospheric pressure such as to cause boiling of said contents at the existing temperature thereof, thereby to sweep the air out of said head space by the vapors evolved from such boiling, and then sealing the container while the head space is filled with said vapors.

5. A method for processing and packaging a liquid food product, which comprises deaerating said product by delivering the same in finely divided form into a chamber having a vacuum therein and thereby removing substantially all air from the product, thereafter delivering the deaerated product into a container in a manner to prevent re-entrainment of air in the product, leaving a head space in the container, subjecting said head space and the liquid contents in the container to a sub-atmospheric pressure such as to cause boiling of said contents at the existing temperature thereof, thereby to sweep the air out of said head space by the evolved vapors, introducing inert gas into the head space in such manner as to prevent re-entrance of air into said space, and then sealing the container while said space is filled with said inert gas.

HORACE L. SMITH, Jr.